United States Patent [19]

Bartoszek

[11] Patent Number: 4,881,794
[45] Date of Patent: Nov. 21, 1989

[54] LOW SMOKE AND REDUCED FLAME FLUORINATED POLYMER COMPOSITIONS AND CABLE CONSTRUCTIONS

[75] Inventor: Edward J. Bartoszek, Jeffersonville, Pa.

[73] Assignee: Pennwalt Corporation, Philadelphia, Pa.

[21] Appl. No.: 236,564

[22] Filed: Aug. 25, 1988

Related U.S. Application Data

[62] Division of Ser. No. 847,351, Apr. 2, 1986, Pat. No. 4,804,702.

[51] Int. Cl.$^4$ ............................................. G02B 6/44
[52] U.S. Cl. .................................................. 350/96.23
[58] Field of Search .......................... 350/96.23, 96.34; 174/68 A, 110 R

[56] References Cited

U.S. PATENT DOCUMENTS

| | | | |
|---|---|---|---|
| 3,503,923 | 3/1970 | Petrella et al. | 260/41 |
| 3,510,429 | 5/1970 | Iserson et al. | 252/62 |
| 4,225,649 | 9/1978 | Peterson | 428/383 |
| 4,307,010 | 12/1981 | Sandler et al. | 260/42.47 |
| 4,327,001 | 4/1982 | West et al. | 524/322 |
| 4,401,845 | 8/1983 | Odhner et al. | 174/113 R |
| 4,456,654 | 6/1984 | Kotian | 428/383 |

OTHER PUBLICATIONS

European Search Report on application corresponding to parent application S/N 236,564.

Primary Examiner—William L. Sikes
Assistant Examiner—Robert E. Wise

[57] ABSTRACT

Fluorinated polymer based compositions which include aluminum silicates and electrical and fiber optic cable constructions made from such compositions have improved low smoke and flame retardant properties.

5 Claims, 1 Drawing Sheet

LOW SMOKE AND REDUCED FLAME FLUORINATED POLYMER COMPOSITIONS AND CABLE CONSTRUCTIONS

This is a division of co-pending application Ser. No. 847,351, filed on 4/2/86, now U.S. Pat. No. 4,804,702.

BACKGROUND OF THE INVENTION

One of the notable characteristics of partially or totally fluorinated polymers is their relative low susceptibility to burning and the low level of smoke generated in such situations as compared with other polymers. This characteristic has been utilized in the wire and cable industry, among others, and more specially in plenum cable constructions and fiber optic cable applications.

Polyvinylidene fluoride homopolymers as well as co-and terpolymers of vinylidene fluoride (PVDF) with other fluorinated monomers such as hexafluoropropylene and tetrafluoroethylene are being used in such applications. Examples of such materials are the various PVDF grades supplied by Pennwalt for these uses under the trademark KYNAR. Other polyfluorinated resins for such applications include fluorinated ethylene propylene (FEP) resin and ethylene-chlorotrifuloroethylene copolymer resin (ECTFE).

Fluoropolymers have LOI (Limiting Oxygen Index) values ranging from the 40's to 90's, as determined by ASTM D-2863. The higher index numbers are achieved by the least flammable polymers. Polyvinylidene fluoride based resins have LOI values in the lower end of that range. In fluoropolymer cable constructions, where both the primary insulation or protective layer and jacket material are composed of fluoropolymer, smoke density and flame spread have generally not been a problem. Such cables are described for example in U.S. Pat. No. 4,401,845. However, in some cable applications and especially in hybrid cable constructions using non-fluoropolymer primary insulation on wires or fiber optic strands in combination with the fluoropolymer jacket encasements, smoke density and/or flame spread problems may occur. Therefore, reducing the smoke density and flame spread properties of the fluorinated polymers and especially PVDF based polymers without significant change in processing properties or in physical properties is a desirable goal. The cable constructions would then exhibit a greater tolerance to the inclusion of non-fluorinated components.

The use of siliceous materials has been reported in patents and other open literature for flame retardation and smoke suppression in various applications such as in polymer foam, fabrics, and building products. Examples of smoke and flame retardation in wire and cable applications include U.S. Pat. No. 4,456,654 disclosing the use of calcium silicate, magnesium silicate and hydrated alumina fillers with an elastomer. U.S. Pat. No. 4,225,649 discloses an aqueous emulsion composition which contains several ingredients including clay. U.S. Pat. No. 4,327,001 discloses cross linked polyolefin jacketing relying mainly on magnesium silicate and alumina hydrate for low smoke characteristics. The addition of molybdates to PVDF has been disclosed for flame and smoke suppression in French Patent Application No. 2,534,264, but molybdates are relatively expensive.

According to U.S. Pat. No. 3,510,429 a layer of vinylidene polymer containing 2 to 70% by weight of a nonflammable, energy reflective light colored pigment, protects personnel and articles from short term intense thermal radiation such as from an atomic explosion. Among the examples of suitable reflective pigments is aluminum silicate. Dense white smoke evolution is said to occur and aid in the dissipation and attenuation of the intense thermal energy.

I have now found that certain aluminum silicates impart excellent flame and smoke retardant properties to fluorocarbon polymers, which properties are unexpectedly superior when compared to those provided by the use of other siliceous materials.

BRIEF SUMMARY OF THE INVENTION

In accordance with this invention there is provided a low smoke and flame retardant cable construction comprising a bundle of electrical conductors or fiber optic strands encased in a polymer jacket which comprises a fluorinated polymer composition having dispersed therein from about 0.2 to about 5.0 percent by weight of said composition of calcined or hydrated aluminum silicate.

Also provided is a low smoke and flame retardant composition comprising a vinylidene fluoride polymer having dispersed therein from about 0.2 to about 1.2 percent by weight of said composition of calcined or hydrated aluminum silicate.

DETAILED DESCRIPTION

Figure 1:
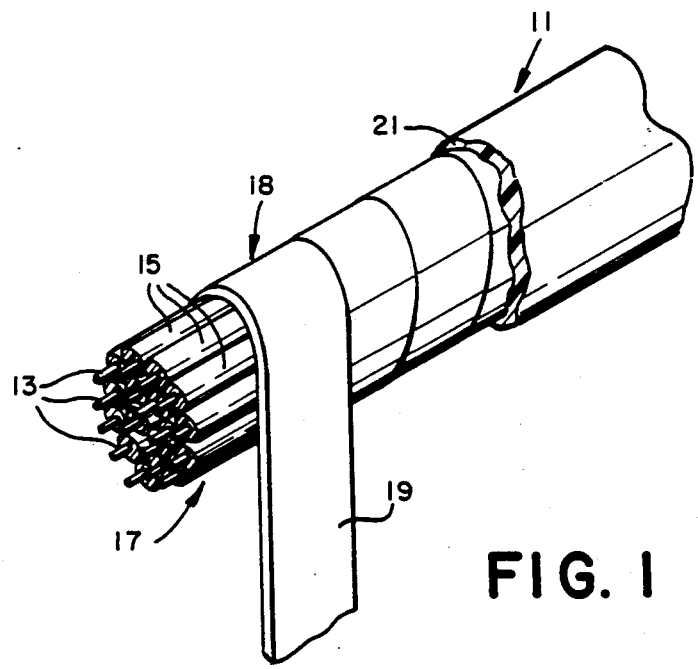
FIG. 1 is an elevational side view, with parts broken away, of an embodiment of a cable construction of the invention.

The electrical cable embodiment of the invention illustrated in FIG. 1 generally comprises a plurality of individual electrical conductors 13 of, for example, copper or aluminum which each have a layer 15 of polymer so that they are electrically insulated from one another. These wires are twisted into a bundle 17 and the bundle 17 is held together to form core 18 by sheath 19. Sheath 19 can be a polymer film such as Mylar ® polyester film tape, a resin impregnated tape material such as E-glass cloth impregnated with polytetrafluoroethylene (Fluoroglass), or other conventional wire wrapping materials. The insulating layer 15 can be of materials which are conventionally used for primary wire insulation such as silicon rubber, or polymers such as polyethylene, polypropylene, polyvinyl chloride, chlorinated polyethylene, polyamides and fluoropolymers. Jacket 21 can be formed by extrusion using a cross head from a fluorinated polymer, preferably polyvinylidene fluoride, containing hydrous or calcined aluminum silicate.

In a fiber optic embodiment the wires would be replaced by glass optical fiber strands. A typical construction is to wrap a group of six glass fiber optic strands around another glass strand or a coated steel wire or core, protect the group with a plastic coating and then make a cylindrical cable by combining a number of such groups and surrounding the combined groups of fibers with the fluoropolymer jacket 21.

"Fluorinated polymers" as used herein include, for example, vinylidene fluoride polymers, polytetrafluoroethylene (PTFE), fluorinated ethylene-propylene polymers, ethylene-chlorotrifluoroethylene copolymers, perfluoroalkoxy polymers (PFA), and ethylene-tetrafluorothylene copolymers.

The term "vinylidene fluoride polymer" includes normally solid, high molecular weight homopolymers and copolymers within its meaning. Such copolymers include those containing at least 50 mole percent of vinylidene fluoride copolymerized with at least one comonomer selected from the group consisting of tetrafluoroethylene, trifluoroethylene, chlorotrifuloroethylene, hexafluoropropene, vinyl fluoride, pentafluoropropene, and any other monomer that would readily copolymerize with vinylidene fluoride. Particularly preferred are copolymers composed of from at least about 70 and up to 99 mole percent vinylidene fluoride, and correspondingly from 1 to 30 percent tetrafluoroethylene; about 70 to 99 percent vinylidene fluoride and 1 to 30 percent hexafluoropropene; and about 70 to 99 mole percent vinylidene fluoride and 1 to 30 mole percent trifluoroethylene.

The cable jacket 21 is formed from compositions of fluorinated polymers having dispersed therein an amount (generally from about 0.2 to about 5.0 percent by weight of composition) of calcined or hydrated aluminum silicate ($Al_2O_3.2SiO_2.nH_2O$ where n=0 to 2) which is effective to improve the smoke and flame retardant properties of the composition.

Aluminum silicates for use in the invention should be relatively pure (preferably about 95 weight percent) aluminum silicate. Those materials derived from kaolin clay and marketed as pigments and extenders, for example, by Englehard under the trademark Santinone® and by Burgess Pigment Company are suitable.

Up to about 5 percent by weight of composition of other additives can also be used in the compositions such as color reducers (ZnO), U.V. stabilizers, antioxidants, lubricants (graphite), plasticizers, surface modifiers, coloring agents (dyes or pigments), fillers, reinforcements (glass, carbon, mineral and synthetic fibers) and other fire retardants. The preferred compositions for use in the cables of the invention comprise a blend of about 93.8 to 99.75 percent by weight vinylidene fluoride polymer, about 0.2 to about 1.2 percent by weight calcined or hydrous aluminum silicate and a combined amount of up to about 5.0 (preferably 0.05 to 5.0) percent by weight zinc oxide and/or polytetrafluoroethylene. Including PTFE improves the surface gloss on the cable jackets. Because the aluminum silicate lowers the impact strength of the vinylidene fluoride polymer, where it is necessary to maintain the impact strength of the polymer at or above about 6 ft lbs./in. the amount of aluminum silicate must be kept to about 1.2% by weight or less.

To further enhance the low smoke and flame spread properties of the cables, the primary insulating layers 15 can also be formed of the fluorinated polymer-aluminum silicate compositions.

The additives can be blended with the fluorinated polymers using conventional polymer milling and mixing equipment so as to provide a good dispersion of the additives in the base polymer. A Brabender Plasticorder mixer was used in the following examples to prepare samples of the compositions from a powder/powder blend of additive(s) and base polymer for smoke and flame testing.

The invention is further illustrated by the following examples which demonstrate the enhanced low smoke and flame spread properties both of the aluminum silicate containing compositions and the cable structures prepared therefrom.

Examples 1 and 2

Compositions were prepared by making a powder blend of vinylidene fluoride-hexafluoropropylene copolymer (88/12 by weight) with 2.5 percent by weight of composition of either hydrous ($Al_2O_3.2SiO_2.2H_2O$) or calcined aluminum silicate (n=0) by low-intensive blending, mixing the blends in a Brabender mixer for 5 minutes at a temperature of 225° C. and an agitator speed of 50 r.p.m. After mixing, approximately 0.05 inch thick plaques were made by compression molding at about 1000 psi for 3 minutes at 230° C. and quenched by inclusion between room temperature metal plates. One inch square samples for burn testing according to ASTM D2843 to determine the Smoke Index were cut from the plaques. The standard ASTM D2843 procedure was modified in that the chamber used had no exit sign, the sample and a natural gas flame were placed off center toward the light source side of the chamber and there was no temperature compensation for the electric eye. Five $1\times1\times0.05$ inch squares were stacked in order to provide the standard $1\times1\times0.25$ inch sample size.

The measurements were made by measuring the lowest transmission of light through the chamber as a percentage of the initial smokeless chamber transmission. These numbers were converted to an optical density by the following formula: Optical density =log (100/transmission). The Calculated Optical Density is the "Smoke Index". The results of the Smoke Index determination on the samples, compared with a control sample of copolymer alone, are given in Table 1.

The limiting oxygen index (LOI), which is a measure of the amount of oxygen needed to support combustion of the compositions, was determined according to ASTM D2863 except that 0.06 inch thick samples were molded and used instead of the standard 0.125 inch thick samples. The results of the LOI determinations along with the pure copolymer control are given in Table 1.

According to the results reported in Table 1 the compositions which contains aluminum silicate provide an order of magnitude decrease in the Smoke Index compared to the control and an approximate doubling of the LOI.

TABLE 1

| | Vinylidene Fluoride - Hexafluoropropylene Copolymer (88/12) | | |
|---|---|---|---|
| Example | Wt % Aluminum Silicate | Smoke Index | LOI |
| Control | 0 | .77 | 37 |
| 1 | 2.5 (hydrous) | .06 | 78 |
| 2 | 2.5 (calcined) | .06 | 82 |

Comparison

A number of siliceous materials were tested at 2.5 weight percent level including fumed silica, amorphous silica, calcium silicate, calcium metasilicate, barium silicate, mica and talc. The Smoke Index results ranged from 0.92 for barium silicate to 0.52 for mica compared with 0.77 for the control. The aluminum silicate additives used in the invention, therefore, provide an unexpectedly superior result compared to other siliceous materials. The aluminium silicates have the advantage over materials such as molybdates of being inexpensive and readily available. The excellent low smoke and flame spread properties make the compositions especially useful in electrical wire and cable insulation and jacketing for plenum wire installations.

Examples 3–4

Samples for Smoke Index determination were prepared according to the process described in Examples 1 and 2 except that a vinylidene fluoride homopolymer containing 1 wt percent polytetrafluoroethylene to improve surface gloss was used. The Smoke Index of the polymer composition was improved by an order of magnitude using the aluminum silicate additives as shown by the results in Table 2.

TABLE 2

| | Vinylidene Fluoride Homopolymer With 1 wt % PTFE | |
|---|---|---|
| Example | Wt % Aluminum Silicate | Smoke Index |
| Control[1] | 0 | .66 |
| 3 | 1.0 (calcined) | .07 |
| 4 | 1.0 (hydrous) | .03 |

[1] A control sample of the pure vinylidene fluoride homopolymer gave a smoke index of .85

Example 5–24

Samples for Smoke Index determination were prepared from a vinylidene fluoride-hexafluoropropylene copolymer (88/12) containing varying amounts of either hydrous or calcined aluminum silicate (from 0.33 to 2.00 weight percent) and from 0.33 to 2.0 percent zinc oxide which was added to give improved color. The zinc oxide by itself produces a nominal improvement to the Smoke Index.

TABLE 3

| | Vinylidene Fluoride-Hexafluoropropylene Copolymer 88/12 | | |
|---|---|---|---|
| Example | Wt % Aluminum Silicate | Wt % ZnO | Smoke Index |
| Control | 0 | 2.50 | .47 |
| 5 | .33 Hydrous (H) | .66 | .44 |
| 6 | 1.00 (H) | 1.33 | .22 |
| 7 | .50 (H) | 2.00 | .19 |
| 8 | 1.00 (H) | .50 | .20 |
| 9 | 1.00 (H) | 1.00 | .14 |
| 10 | 1.50 (H) | 1.50 | .19 |
| 11 | .66 (H) | .33 | .35 |
| 12 | 1.33 (H) | .66 | .20 |
| 13 | 1.66 (H) | .83 | .10 |
| 14 | 2.00 (H) | 1.00 | .18 |
| 15 | .33 Calcined (C) | .66 | .24 |
| 16 | .66 (C) | 1.33 | .26 |
| 17 | 1.00 (C) | 2.00 | .18 |
| 18 | .50 (C) | .50 | .11 |
| 19 | 1.00 (C) | 1.00 | .10 |
| 20 | 1.50 (C) | 1.50 | .11 |
| 21 | .66 (C) | .33 | .15 |
| 22 | 1.33 (C) | .66 | .09 |
| 23 | 1.66 (C) | .83 | .10 |
| 24 | 2.00 (C) | 1.00 | .12 |

The results in Table 3 again demonstrate the significant reduction in the Smoke Index which is achieved by the presence of aluminum silicate in the compositions.

Examples 25–29

Samples were prepared according to the process described in Examples 1 and 2. As additives in the (88/12) vinylidene fluoride-hexafluoropropylene copolymer were included, in addition to aluminum silicate, an alkyl aryl phosphate flame retardant plasticizer (Santiciser ® 141 Monsanto) (Example 25) antimony oxide (Examples 26 and 27) and calcium carbonate (Examples 28 and 29). The Smoke Index results are given in Table 4.

TABLE 4

| Example | W % Aluminum Silicate | Wt % Additive | Additive | Smoke Index |
|---|---|---|---|---|
| Control | 0 | 2.5 | alkyl aryl phosphate | .41 |
| 25 | 1.0 (C) | 1.0 | alkyl aryl phosphate | .04 |
| Control | 0 | 2.5 | antimony oxide | .46 |
| 26 | 1.66 (H) | .83 | antimony oxide | .11 |
| 27 | 1.66 (C) | .83 | antimony oxide | .06 |
| Control | 0 | 2.5 | calcium carbonate | .38 |
| 28 | 1.66 (H) | .83 | calcium carbonate | .11 |
| 29 | 1.66 (C) | .83 | calcium carbonate | .10 |

Example 30

A telephone cable construction containing 100 pairs of conductors was manufactured by the following steps:

1. Copper wire of 24 AWG was coated by pressure extrusion with a 8 mil thick layer of a vinylidene fluoride-hexafluoroprepylene copolymer (88/12 by weight) containing 0.9 percent by weight of calcined aluminum silicate.
2. Two insulated wires made by Step 1 were twisted together to from a pair of conductors and 100 pairs of such conductors were then twisted together to form a bundle having a total of 200 conductors.
3. The bundle formed in Step 2 was then wrapped with a glass tape (E-glass cloth impregnated with polytetrafluoroethylene resin 0.025 inch thick and 1½ inches wide).
4. The core formed in Step 3 was jacketed by tubing extrusion with a 40 mil thick layer of the same copolymer and aluminum silicate composition used for the primary wire insulation in Step 1.

Example 31

A telephone cable construction containing 100 pairs of conductors was formed as in Example 30 except that the primary insulation in Step 1 was formed of polyvinylidene fluoride homopolymer without any aluminum silicate. The cable jacket was formed as in Example 30 from a vinylidene fluoride-hexafluoroethylene copolymer (88/12 by weight) containing 0.9 percent by weight of calcined aluminum silicate.

Two samples each of the cables prepared in Examples 30 and 31 were tested by a modified Steiner Tunnel test UL 910 (ASTM E84). The Steiner Tunnel test was modified to adapt the UL 910 test procedure to adequately test cables. The standard flame and draft conditions were used (240 fpm in the direction of flame growth and a 300,00 Btu/hr 4½ foot long methane igniting flame). The duration of the test was chosen as 20 minutes and the sample cables were supported on a 12 inch wide cable rack in the zone of maximum temperature and heat concentration in a single layer which completely filled the rack width. The maximum flame spread was recorded rather than a flame spread factor. The smoke development was monitored by a photometer system in the test furnace exhaust duct and the optical smoke density was calculated from the light attenuation values. The results are given in Table 5 below:

TABLE 5

| Cable Construction | No. of Cables | Maximum Flame Spread (ft) | Optical Smoke Density Peak | Optical Smoke Density Average |
|---|---|---|---|---|
| Ex 30 | | | | |
| #1 | 15 | 2.0 | 0.14 | 0.03 |
| #2 | 15 | 3.0 | 0.08 | 0.03 |
| Ex 31 | | | | |
| #1 | 15 | 2.0 | 0.06 | 0.02 |
| #2 | 15 | 2.5 | 0.05 | 0.01 |
| UL Standard (Maximum) | Filled Rack | 5.0 | 0.50 | 0.15 |

The results reported in Table 5 demonstrate that the cables of the invention give flame spread and smoke densities well within the Underwriters Laboratories standard.

I claim:

1. A low smoke and flame retardant cable comprising a bundle of electrical conductors or fiber optic strands encased in a polymer jacket which comprises a vinylidene fluoride polymer composition having dispersed therein from about 0.2 to about 1.2 percent by weight of said composition of aluminum silicate selected from calcined or hydrated aluminum silicate consisting essentially of $Al_2O_3 \cdot 2SiO_2 \cdot nH_2O$ wherein n = 0 to 2.

2. The cable according to claim 1 wherein the fluorinated polymer composition comprises from about 93.8 to about 99.75 percent by weight vinylidene fluoride polymer, from about 0.2 to 1.2 percent by weight calcined or hydrous aluminum silicate, and from about 0.05 to about 5.0 percent by weight of one or more additives selected from color reducers, stabilizers, lubricants, plasticizers, coloring agents, reinforcements and fillers.

3. The cable according to claim 2 wherein the cable comprises a bundle of electrical conductors having said fluorinated polymer composition as primary insulation said bundle having a wrapping of an insulating tape.

4. The cable according to claim 3 wherein said vinylidene fluoride is a vinylidene fluoride (88 percent by weight)-hexafluoropropylene (12 percent by weight) copolymer.

5. The cable according to claim 1 wherein the cable comprises a bundle of electrical conductors having said fluorinated polymer composition as primary insulation, said bundle having a wrapping of an insulating tape.

* * * * *